(12) United States Patent
Laro

(10) Patent No.: US 8,220,413 B2
(45) Date of Patent: Jul. 17, 2012

(54) PET FOOD SERVER

(76) Inventor: Tunji S Laro, Secaucus, NJ (US)

(*) Notice: Subject to any disclaimer, the term of this patent is extended or adjusted under 35 U.S.C. 154(b) by 120 days.

(21) Appl. No.: 12/882,246

(22) Filed: Sep. 15, 2010

(65) Prior Publication Data

US 2012/0060761 A1 Mar. 15, 2012

(51) Int. Cl.
*A01K 5/02* (2006.01)

(52) U.S. Cl. ............................ 119/51.11; 119/51.12

(58) Field of Classification Search .......... 119/51.11, 119/51.12, 51.04, 51.13; 30/401, 410, 405
See application file for complete search history.

(56) References Cited

U.S. PATENT DOCUMENTS

| | | | |
|---|---|---|---|
| 2,528,742 A * | 11/1950 | Coffing | 119/51.12 |
| 3,658,036 A * | 4/1972 | Caracappa | 119/51.13 |
| 3,720,186 A * | 3/1973 | O'Rourke | 119/51.12 |
| 3,826,231 A * | 7/1974 | Crawford et al. | 119/51.12 |
| 4,077,360 A * | 3/1978 | Figlia | 119/51.12 |
| 4,249,483 A * | 2/1981 | Sobky | 119/51.12 |
| 4,421,059 A * | 12/1983 | Cousino | 119/51.12 |
| 4,485,765 A * | 12/1984 | Schwartz et al. | 119/51.13 |
| 4,492,183 A * | 1/1985 | Chiotasso et al. | 119/51.13 |
| 4,501,229 A * | 2/1985 | Williamson | 119/51.12 |
| 4,671,210 A * | 6/1987 | Robinson et al. | 119/51.12 |
| 4,805,560 A * | 2/1989 | Knego et al. | 119/51.12 |
| 5,176,103 A * | 1/1993 | Reid et al. | 119/51.13 |
| 5,222,461 A * | 6/1993 | Haynes | 119/62 |
| D339,429 S * | 9/1993 | Reid et al. | D30/121 |
| 5,377,620 A * | 1/1995 | Phillippi | 119/51.12 |
| 5,584,263 A * | 12/1996 | Sexton | 119/51.5 |
| 5,975,024 A * | 11/1999 | Sheaffer | 119/477 |
| 6,349,671 B1 * | 2/2002 | Lewis et al. | 119/51.02 |
| 6,766,766 B1 * | 7/2004 | Elliott | 119/57.92 |
| 7,650,855 B2 * | 1/2010 | Krishnamurthy | 119/51.11 |
| 7,874,265 B1 * | 1/2011 | Addleman | 119/63 |
| 2006/0219187 A1 * | 10/2006 | Krishnamurthy | 119/719 |

* cited by examiner

*Primary Examiner* — Yvonne Abbott

(74) *Attorney, Agent, or Firm* — Oakwood Law Group, LLP; Yuchien Wei; Stephen Liu

(57) ABSTRACT

A pet food server for dispensing pet food from a recently opened can at preselected intervals of time where the pet food feeder includes a cylindrical member, a sliding panel for holding an unopened can of pet food located within the cylindrical member, and an electric can opener located on a pedestal for lowering the can opener to the top of the can of unopened pet food to cut the lid from the can and then raising the can opener to its initial position. An electro-magnet is attached to the can opener for lifting the lid off the can of pet food as the can opener is raised to its initial position, and the sliding panel is moved with the can of open pet food through an opening in the cylindrical member for a pet to feed.

20 Claims, 2 Drawing Sheets

PET FOOD SERVER

BACKGROUND OF THE INVENTION

1. Field of the Invention

The present invention relates to an apparatus for feeding pets and, more particularly, to a pet food server that automatically provides wet food from recently opened cans to a pet at predetermined time intervals.

2. Description of Related Art

Various devices for automatically feeding pet animals is known in the prior art. More specifically, by way of example, U.S. Pat. No. 6,622,655 to Springett discloses an automatic food dispenser for animals, fish or the like, comprising a housing, controls, and with a hopper within, for containing food, the base of the hopper having an opening for the food to exit, and the opening is in close proximity to a dispensing mechanism. The mechanism has a surface which creates a seal that prevents the undesired escape of food from the hopper and has an aperture on its surface, where, with the rotation of the dispensing mechanism about its axis, and the subsequent alignment of the aperture with opening at the base of the hopper, feed may escape from the hopper through the aperture, and hence directly through the open base of the dispensing mechanism.

U.S. Pat. No. 5,433,171 to Ewell discloses an automatic animal feeding apparatus having an exterior cabinet, a base member supporting the exterior cabinet, a water tank disposed within the exterior cabinet, and a food hopper disposed within the exterior cabinet and positioned adjacent to the water tank. A food bowl and a water bowl are positioned substantially on a top surface of the base member. In addition, there is a first pressure sensing mechanism for generating a first analog signal corresponding to the weight of the water bowl, and a second pressure sensing mechanism for generating a second analog signal corresponding to the weight of the food bowl.

U.S. Pat. No. 4,706,849 to Ryan discloses a dispensing device which has an open ended cylinder member for receiving a can container having an open end supported on an annular shoulder at one end of the cylinder member. A cup shaped piston, extendible and retractible relative to the other end of the cylinder member carries a piercing member to pierce a hole in the closed end of the can on an initial retraction of the cup shaped piston within the cylinder member. A second retraction of the piston applies pressure on the material in the can for discharge from its open end into a material receiving chamber from where it is ejected into a feeding dish. An air bleed hole in the piston is open during the piercing operation and manually closed when material is to be discharged from the can.

U.S. Pat. No. 4,249,483 to Sobky discloses a device for serving fresh moist pet food and/or water at preselected time intervals. A tray is provided which has multiple upwardly opening compartments disposed circumferentially about a central vertical axis. The compartments contain moist pet food and also water if desired. A circumferentially continuous sheet of wrapping material overlies the compartments of the moist pet food. The compartments are serially exposed at preselected time intervals, and the wrapping material is removed from the exposed compartments as they are exposed, so that the moist pet food and/or water is provided at selected intervals.

U.S. Pat. No. 4,079,699 to Longmore, et al. discloses a container where the upper part is a storage unit for feed and, at the bottom of the storage unit there is a small opening in which rollers are located close together and are energized to let the food pass between them. The rollers are counter rotated to slowly turn and dispense the food onto a tray which will at a given weight, adjusted by a control level located in the back, dump the dry feed into a dish outside of the container. This process is triggered by a timer that actuates the motor driven rollers to allow them to pass the food into the tray. As the tray is being measured, water is also being released and, if desired, may mix with the food. The water is at the same time also going into a separate water container for the purpose of drinking. The invention solves the problem of leaving an unattended animal for periods of time where the animal would otherwise need food and water. The animal may be fed either dry or moistened food either once or twice a day, at the owner's discretion.

U.S. Pat. No. 4,077,369 to Figlia discloses an apparatus for a single feeding of an unattended pet out of an initially hermetically sealed can of pet food. In operation, when the motor is started to effect rotation of the gear, the cam forces the cam follower and therewith the slide member downwardly slightly, so that the cutter blade is forced through the lid of the can at the beginning of the cycle and is then held there while the can turns to sever the lid from the body of the can. At the end of the cycle, a rise in the cam raises the cam follower and the slide member to retract the cutter blade upwardly and thereby to release the can and concurrently to open the motor energization circuit. A ramp is provided below the cutter blade and turning gear combination for guiding the lidless released can to a receiving location outside the housing where the can will be accessible to the animal to be fed.

U.S. Pat. No. 4,044,722 to Bradshaw discloses a timed pet food dispenser wherein a plurality of insulated and covered food containers are rigidly and removably mounted to a rotating dispensing wheel for periodic automatic dispensing of the pet food at predetermined times by gravity to a pet food pen.

U.S. Pat. No. 3,782,332 to Depenthal, et al. discloses a feeding device for the automatic feeding and watering of cats and dogs. The feeding device includes a food container having a plurality of individual food storage compartments mounted on a delivery chute for delivering food from each compartment to a feeding pan upon the selective opening of closure members. The feeding device also includes a watering device having a water storage container, a valve operably connected to the water storage container and a watering pan for supplying water from the container to the watering pan on demand.

U.S. Pat. No. Des. 338,287 to Tonner discloses an ornamental design for a timed pet feeder

SUMMARY OF THE INVENTION

In an exemplary embodiment of the present invention, there is disclosed a pet food server for dispensing pet food from a recently opened can at preselected intervals of time comprising:

a cylindrical member;
a sliding panel for holding an unopened can of pet food located within said cylindrical member;
an electric can opener located on a pedestal for lowering the can opener to the top of the can of unopened pet food to cut the lid from the can and then raising the can opener to its initial position;
an electro-magnet attached to the can opener for holding a lid of a can of pet food that is cut; and
means for moving the sliding panel with the can of open pet food through an opening in the cylindrical member for a pet to feed.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

At various times during the year it is normal for a pet to be left alone in a home for an extended period of time while the pet owner is on a business trip, a short vacation, working long hours, etc. In many instances such absences can be for a time interval which can be as short as twelve hours or as long as two days. These absences can cause a problem for both the pet, such as a dog or cat, and the owner of the pet. Normally the pet owner may impose upon a friend or hire a stranger to either keep the pet while the he/she is away or allow the friend or stranger to enter his/her home to feed the pet. The invention here disclosed is an electronic programmable pet feeder which includes a can opener for opening a can of pet food while the can is inside the pet feeder and not accessible to the pet, a dispensing mechanism for moving the open can of pet food to a location outside of the feeder which is now accessible for the pet to feed, and a programmable timing device which is set by the pet owner for the can of pet food to be made accessible to the pet.

With this invention, a pet owner can now dispense a recently opened can of moist or wet pet food to his/her pet at any time during the day or night without being present. A key pad is provided to allow the pet owner to program the time of day and the number of times during a day that a can of pet food is opened and made accessible to a pet.

Figure 1:
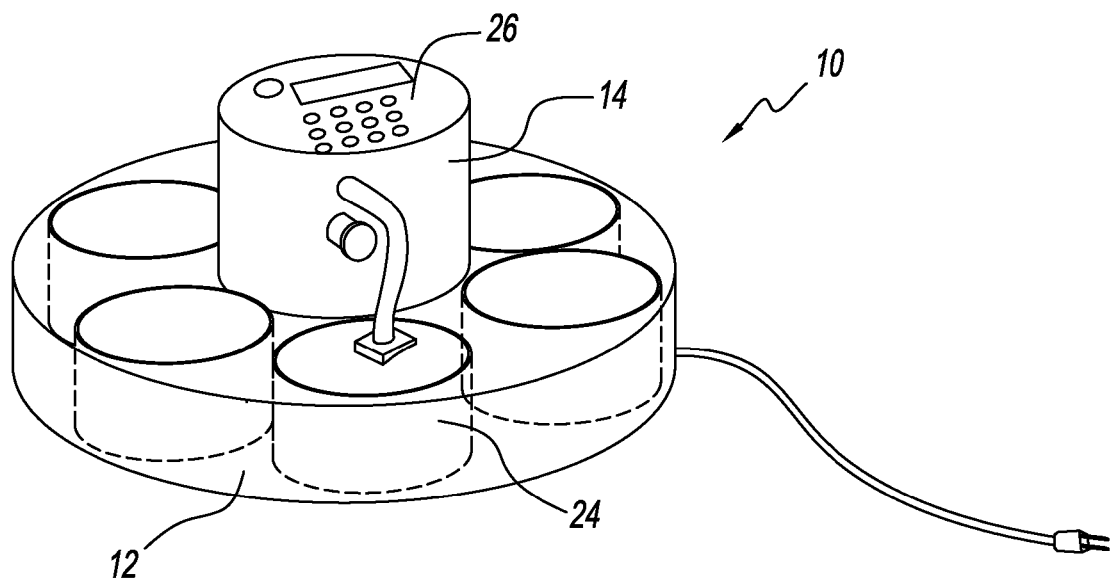
FIG. 1 is a top perspective view of a preferred embodiment of the pet food server in accordance with the principles of the invention.

Referring to FIG. 1, there is shown a top schematic view of a preferred embodiment of the pet food server in accordance with the principles of the invention. The pet food server 10 consists of a cylindrical member 12 which can be about twelve to fourteen inches, more or less, in diameter and about ten inches, more of less, in height. The bottom surface of the cylinder is attached to a sheet of high friction material such as rubber to prevent the food server from being moved or pushed by a pet. Located within the cylindrical member 12 is an electric can opener 14. The electric can opener can be located in the center of the cylindrical member and is mounted on an electrically adjustable pedestal (not shown) that moves the can opener up and down to different height positions to open pet food cans of different heights.

Figure 2:
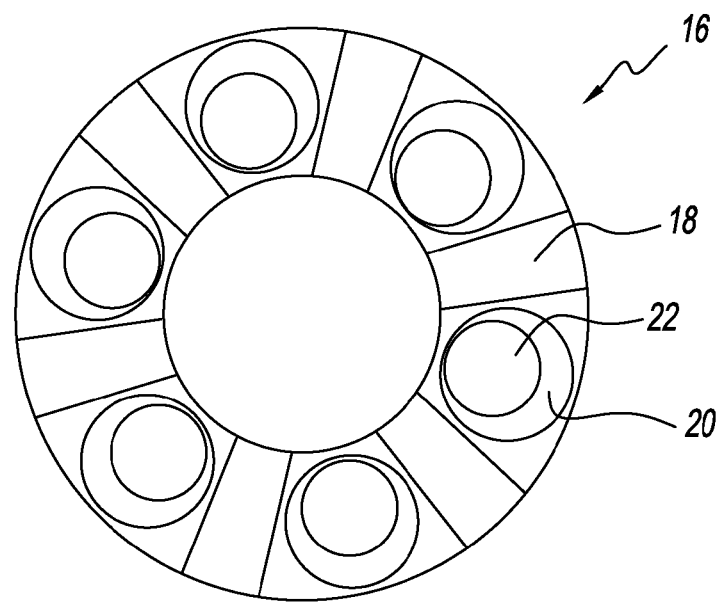
FIG. 2 is a top view of the ring tray and sliding panels located thereon.

Located on the inside bottom of the cylindrical member is a rotatable ring tray which is adapted to hold up to six cans of pet food. Referring to FIG. 2, the rotatable ring tray is coupled to a stepping motor (not shown) which rotates the ring tray sixty degrees to accurately locate and align a new can of pet food next to the cutting wheel on a can opener each time a new can of pet food is to be opened. The ring tray includes six sliding panels 18 where each sliding panel is adapted for holding and positioning a can of pet food. Each sliding panel includes two circular depressions 20, 22 for receiving and positioning a large diameter pet food can or a medium diameter pet food can. The depressions are eccentrically located so that an edge of either a medium or a large diameter pet food is aligned with the cutting wheel of the can opener. Each slidable panel 18 is coupled to a drive mechanism (not shown) that is controlled by the programmable timing device to urge a recently opened can of pet food on the slidable panel to move thru an opening 24, as shown in FIG. 1, in the side of the cylindrical member.

When the slidable panel is located outside the cylindrical member, it is cantilevered to the ring tray. The open pet food can remains on the outside of the cylindrical member for the pet to feed for an interval of time that is determined by the programmable timing device. At the end of the interval of time set for the pet to feed, the slidable panel 18, and the empty can, is moved back into the cylindrical member. At this time the ring tray remains immediately below the can opener until the next feeding time when the ring tray is then stepped sixty degrees to position and align a new can of pet food beneath the can opener.

The bottom of the cylindrical member is attached to a sheet of high friction material such as rubber to prevent the pet feeder from being moved by the pet while he/she is feeding. In addition, the can opener and the mechanism for positioning the can opener and operating the ring tray, in combination with the weight of the cans of pet food add sufficient weight to the pet feeder to insure that it will remain at one location and not be moved by the pet as he is feeding.

Referring to FIG. 1, the can opener is located in the center of the cylindrical member and the pet food cans are located in depressions on the sliding panels on the ring tray which rotates around the can opener. The depressions perform two functions. They position and align both medium and large diameter pet food cans with the cutting wheel of the can opener. The depressions also have sufficient depth to prevent a pet from pushing a can off the sliding panel while feeding.

The can opener is mounted on an electrically adjustable pedestal which, in combination with sensors, controls the height of the can opener during various steps of its operation. For example, when the programmable timing device advances to a time which is set for the pet to be fed, the ring tray is rotated to position an unopened pet food can under the can opener which is elevated above the can. At the same time the ring tray locates a can of pet food to be in alignment with an opening in the side of the cylindrical member. When the ring tray has stopped rotating, the electrically adjustable pedestal, which is connected to height sensitive sensors, lowers the can opener to contact the top of the can of pet food and connects the cutting wheel on the can opener to the unopened pet food can. At the same time, current is supplied to an electro-magnet which contacts and firmly attaches to the top of the pet food can. At this time the can opener cuts the top of the can and the electro-magnet lifts the top off the can. If desired, at this time a bell or a chime can be activated to alert the pet that it is meal time. As the electro-magnet lifts the lid off the pet food can, the electrically operated pedestal raises the can opener and the sliding panel on the ring tray is urged to move along the top of the ring tray and out thru the opening in the side of the cylindrical member to provide food to the waiting pet.

After a predetermined interval of time as determined by the setting entered into the programmable timing device by the pet owner, the cantilevered sliding panel is moved back into the cylindrical member and the electro-magnet releases the cover and drops it into the empty pet food can.

To protect the pet and the pet feeder from damage, a cover (not shown) can be attached to the top of the cylindrical member. The key pad which is attached to the top of the cover will have its own cover to prevent the pet from tampering with the key pad.

All of the electronics and electrical components including the can opener and the motors for operating the ring tray, and for raising and lowering the can opener, etc. can be low voltage devices to allow the pet feeder to operate with a battery backup in the event of a power outage.

Prior to a pet owner leaving his/her home for an extended period of time such as, for example eighteen hours, the pet owner removes the cover on the cylindrical member and places six cans of pet food into the depressions in the sliding panels on the ring tray of the pet feeder. The cans of pet food can be of different diameters and different heights. For example, the cans of pet food can have a medium diameter for a medium size can or a large diameter for a large size can. In addition, the cans of pet food can have different heights because the distance that the electrically adjustable pedestal which moves the can opener and the electro magnet down and up is controlled by sensors that detect the top of the can and lowers the can opener to position the cutting wheel onto the pet food can regardless of the height of the can.

After placing the cans of pet food into the pet feeder, the pet owner places the cover onto the pet feeder, plugs the electrical cord into a wall outlet and turns the switch on. The pet owner now programs the timing of each can using the keypad on top of the cover, places a cover over the key pad and leaves knowing that his/her pet will be fed.

At the first programmed time for the pet to be fed the following sequence of events occur:

The electrically adjustable pedestal lowers the can opener and the electro-magnet to the top of the can of pet food.

Power is supplied to the can opener which separates the lid from the can and power is supplied to the electro-magnet which attaches the electro-magnet to the lid of the can.

The electrically adjustable pedestal now raises the can opener to its original position and, at the same time the electro-magnet which is magnetically attached to the lid, raises the lid off the can.

A chime, bell or buzzer is sounded to alert the pet that food is being served.

The sliding panel with the open can of pet food on the ring tray is urged to move out thru an opening in the side of the cylindrical member. At this time the sliding panel is cantilevered from the ring tray and the can of food can be reached by a pet from three sides of the sliding panel. The can of food is available for a time which was set by the pet owner and this time can vary from a half hour up to three or more hours, or until it is time for the next feeding.

At the end of the feeding time, the sliding panel moves back into the cylindrical member, the power to the electro-magnet is turned off and the lid, which was being held by the electro-magnet, falls into the empty can of pet food.

At the time for the next feeding, the ring tray is rotated to locate the next can of pet food under the electric can opener and the cycle noted above is repeated.

Figure 3:
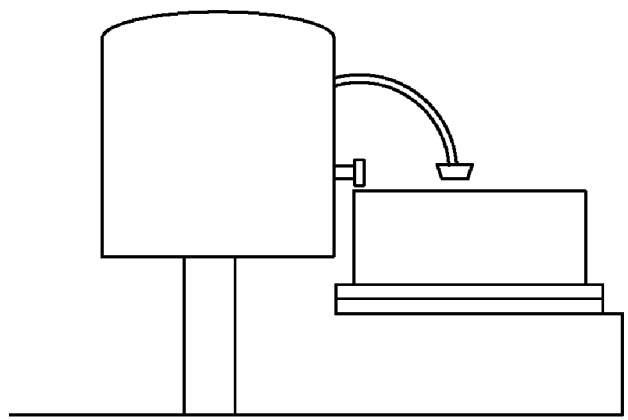
FIG. 3 is a partial side view of the pet food server showing a can of pet food being opened.

FIG. 3 is a partial side view of the pet food server showing a can of pet food being opened.

Figure 4:
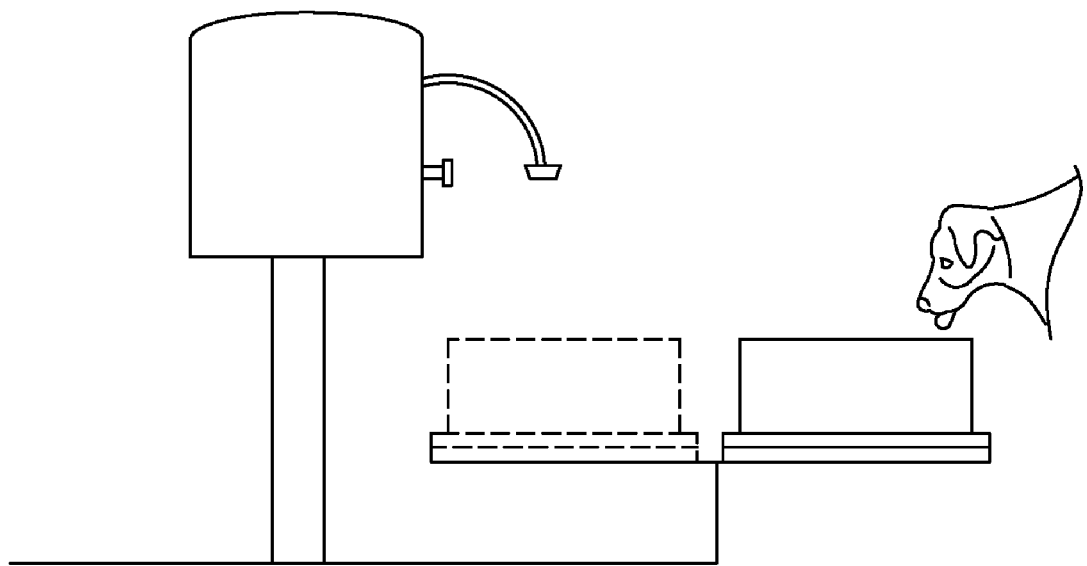
FIG. 4 is a partial side view of the pet food server where the open can of pet food is located outside of the server for access by a pet.

FIG. 4 is a partial side view of the pet food server where the open can of pet food is located outside of the server for access by a pet.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A pet food server for dispensing pet food from a recently opened can at preselected intervals of time comprising:
    a cylindrical member;
    a sliding panel for holding an unopened can of pet food located within said cylindrical member;
    an electric can opener located on a pedestal for lowering the can opener to the top of the can of unopened pet food to cut the lid from the can and then raising the can opener to its initial position;
    an electro-magnet attached to the can opener for holding a lid of a can of pet food that is cut; and
    means for moving said sliding panel with said can of open pet food through an opening in said cylindrical member for a pet to feed.

2. The pet food server of claim 1 wherein said sliding panel is located on a ring tray.

3. The pet food server of claim 2 wherein said electro-magnet pulls the lid from the can as the electric can opener is raised to its initial position.

4. The pet food server of claim 3 wherein said sliding panel includes at least one depression for receiving a can of pet food.

5. The pet food server of claim 4 wherein said depression in said sliding panel is circular.

6. The pet food server of claim 5 wherein said sliding panel includes two circular depressions for receiving pet food cans of different diameters.

7. The pet food server of claim 6 wherein the smaller circular depression is eccentrically located within said larger circular depression.

8. The pet food server of claim 7 wherein said pedestal is adjustable for lowering the can opener to the top of cans of different heights of unopened pet food.

9. The pet food server of claim 8 wherein, after a predetermined interval of time the sliding panel and pet food can is retracted into the cylindrical member and the lid being held by the electro-magnet is dropped into the pet food can.

10. The pet food server of claim 9 further comprising a programmable timing device for setting the time that a can of opened pet food is to be presented to a pet.

11. The pet food server of claim 10 wherein the programmable timing device sets the time duration that an open can of pet food is presented to a pet.

12. The pet food server of claim 11 wherein said ring tray slidably supports six sliding panels.

13. The pet food server of claim 11 wherein a sliding panel is cantilevered from the ring tray when said sliding panel with said can of open pet food is located outside said cylindrical member for a pet to feed.

14. The pet feeder of claim 13 further comprising a cover adapted to be placed on top of said cylindrical member.

15. The pet feeder of claim 14 wherein said programmable timing device is located on the top of said cover.

16. The pet food server of claim 11 wherein an audible sound is generated as a sliding panel with an open can of pet food is presented for a pet to feed.

17. The pet food server of claim 16 wherein said audible sound is that of a chime or a bell.

18. The pet food server of claim 17 wherein said electric can opener is a low voltage can opener.

19. The pet food server of claim 18 wherein a battery back up power supply is provided in the event of a power outage.

20. The pet food server of claim 19 wherein a sheet of high friction material is coupled to the bottom of said cylindrical member to prevent a feeding pet from pushing the pet feeder.

* * * * *